(12) United States Patent
Kim

(10) Patent No.: US 6,473,060 B1
(45) Date of Patent: Oct. 29, 2002

(54) MONITOR CONTROL DEVICE AND CONTROL METHOD THEREOF

(75) Inventor: Young-Chan Kim, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 810 days.

(21) Appl. No.: 08/802,207

(22) Filed: Feb. 18, 1997

(30) Foreign Application Priority Data

Feb. 17, 1996 (KR) ................................ 96-3966

(51) Int. Cl.⁷ .................... G09G 5/02; H04N 17/00
(52) U.S. Cl. .......................... 345/22; 348/177
(58) Field of Search ........................ 345/10, 11, 22, 345/600, 158, 163, 167; 348/177–194

(56) References Cited

U.S. PATENT DOCUMENTS

| | | | |
|---|---|---|---|
| 4,861,175 A | | 8/1989 | Hori et al. |
| 5,187,469 A | | 2/1993 | Evans et al. |
| 5,233,658 A | * | 8/1993 | Bianco et al. ............... 380/25 |
| 5,256,863 A | * | 10/1993 | Ferguson et al. ............ 235/383 |
| 5,448,697 A | * | 9/1995 | Parks et al. ................ 395/162 |
| 5,457,473 A | * | 10/1995 | Arai et al. .................... 345/10 |
| 5,550,556 A | * | 8/1996 | Wu et al. ..................... 345/14 |
| 5,648,781 A | * | 7/1997 | Choi ........................... 341/176 |
| 5,877,745 A | | 3/1999 | Beeteson et al. |

* cited by examiner

Primary Examiner—William A. Cuchlinski, Jr.
Assistant Examiner—Thu Nguyen
(74) Attorney, Agent, or Firm—Robert E. Bushnell, Esq.

(57) ABSTRACT

A monitor control device includes a monitor connected to a computer. The device displays a signal transmitted from the computer in characters or pictures of the form which can be recognized by a user. The device includes an input unit connected to the monitor, for outputting an image tune signal or a picture color tune signal and other control signals, and a controller installed in the monitor, for interpreting the control signals generated from the input unit and transmitting a monitor control signal.

17 Claims, 5 Drawing Sheets

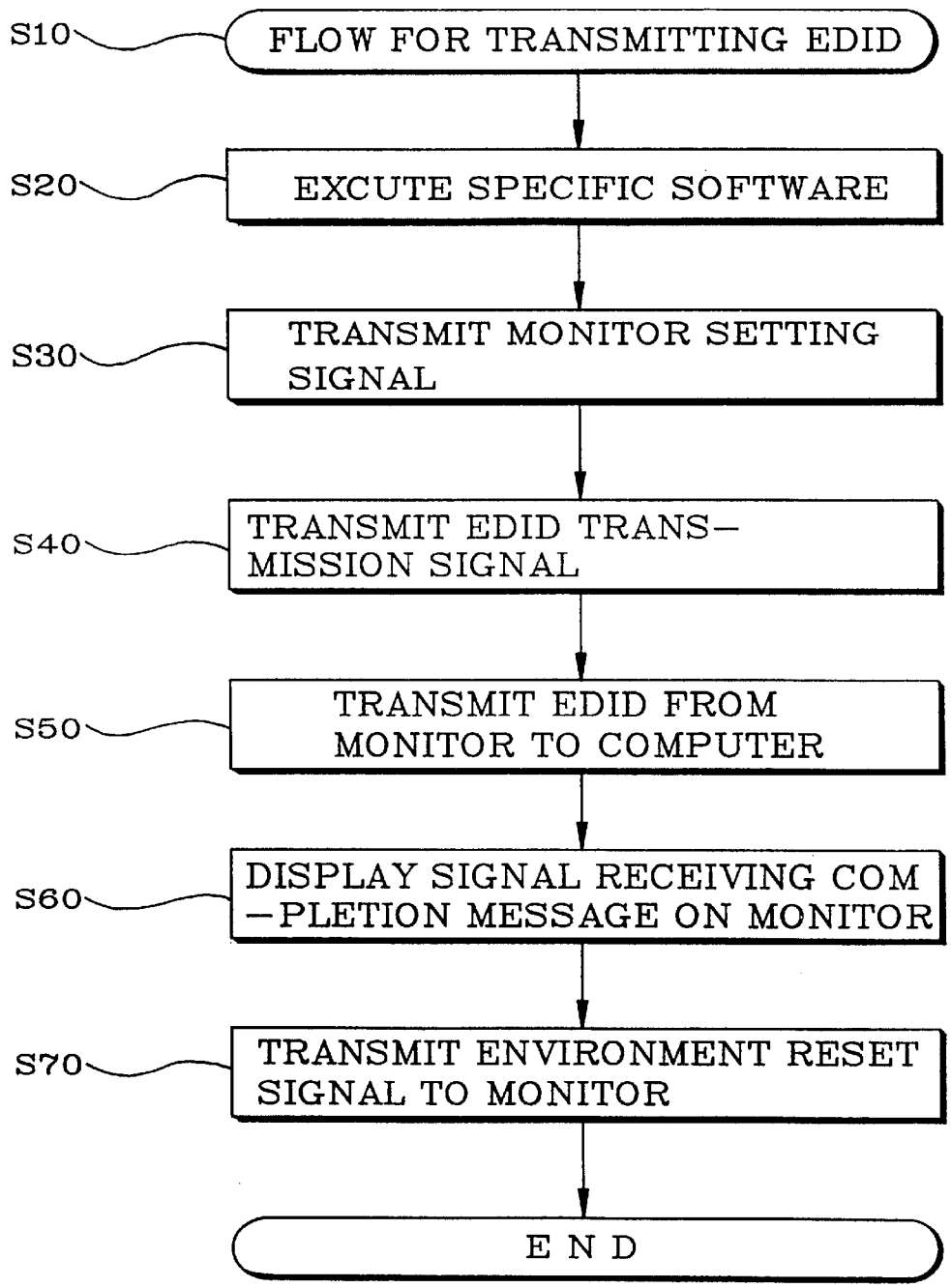

MONITOR CONTROL DEVICE AND CONTROL METHOD THEREOF

CLAIM OF PRIORITY

This application makes reference to, incorporates the same herein, and claims all benefits accruing under 35 U.S.C. §119 from an application entitled MONITOR CONTROL DEVICE AND CONTROL METHOD THEREOF earlier filed in the Korean Industrial Property Office on the day of Feb. 17, 1996, and there duly assigned Serial No. 96-3966 by that Office.

BACKGROUND OF THE INVENTION

1. Field of the Invention

The present invention relates to generally to monitor control devices and processes, and, more particularly, to a monitor control device and process enabling a picture control and other controls of a monitor by using a computer peripheral device.

2. Discussion of Related Art

Contemporary designs for computers and its peripheral devices use have a monitor as one of the peripheral devices for displaying characters or pictures which can be recognized by a viewer in accordance with signals transmitted from the computer. A keyboard has a number of keys each having its own inherent signal content. Thus, if each key is input, the computer performs an operation corresponding to the input key signal. A mouse is another of the input devices for inputting signals to the computer. In contemporary practice, a number of tuning keys are installed in one side of the monitor to adjust the image or color of the picture displayed on the monitor. I have found that the number of such tuning keys that can be installed in the monitor is limited. I have also noticed that this contemporary practice is somewhat inconvenient because a complicated procedure for depressing the tuning keys must be repeated several times in order to perform multiple functions Moreover, it is inconvenient to reach for the tuning keys when the monitor is placed at some distance from a user.

SUMMARY OF THE INVENTION

Accordingly, an object of the present invention is to provide an improved monitor control device and a control method of the monitor control device.

Another object is to provide an improved monitor control device which enables a picture control and other controls of a monitor by using a computer peripheral device.

A further object is to provide a monitor control device which enables a monitor control with a key board and a mouse without the use of a picture tune key on the monitor, a monitor power switch and other functions controlling the visual display, even when the monitor is placed far away from the user and enables the transmission of the monitor information to the computer, and a control method thereof To achieve these or other objects, a monitor control device includes a monitor connected to the computer. The monitor displays the character or picture which is recognizable by the user according to the signal transmitted from the computer. An input device is connected to the monitor, for outputting an image tune signal or a picture color tune signal and other control signals. A controller is installed in the monitor, for receiving and interpreting the control signals generated from the input device and transmitting a signal for controlling the monitor.

In another aspect, the present invention provides a method for controlling a monitor by connecting the peripheral device of a computer to the monitor, which includes the step of receiving a signal generated by the computer peripheral device at a signal receiving unit in the monitor. Other steps may be includes, such as the steps of interpreting the received signal at a signal interpretation controller to determine whether the received signal is for controlling the monitor or for being transmitted to the computer. If the received signal is for controlling the monitor, a monitor control signal can be outputted. If the received signal is for controlling the computer, a computer control signal can be outputted to the computer via a transmission line.

In addition, the present invention provides a method for controlling a monitor by connecting the computer peripheral device to the monitor, which includes the steps of transmitting a monitor setting start signal via the computer peripheral device connected to the monitor, transmitting the setting state of the monitor to the computer via a transmission line connected to the computer, outputting a signal reception completion message from the computer after receiving information on the monitor, and transmitting a reset command to the monitor via the computer peripheral device to reset the environment of the monitor.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 8 is a flow chart showing a process for transmission of extended data in accordance with the principles of the present invention.

DETAILED DESCRIPTION OF PREFERRED EMBODIMENT

Figure 1:
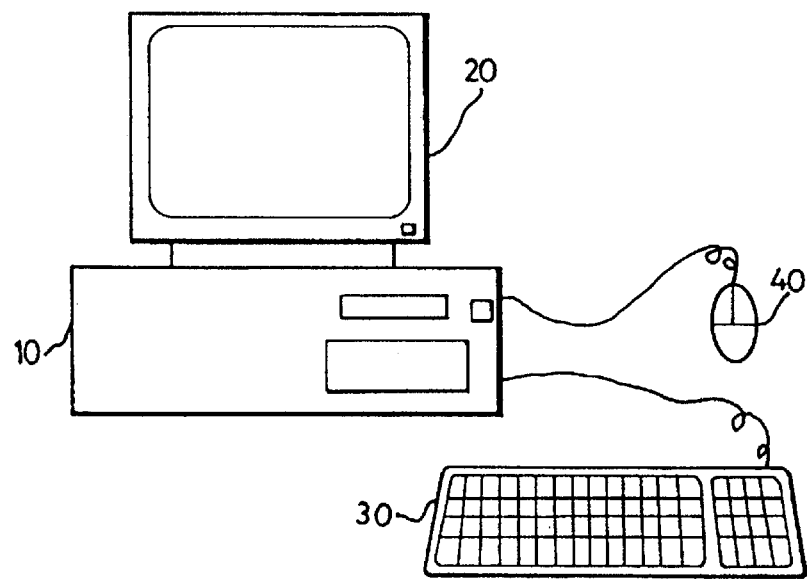
FIG. 1 is a diagram illustrating a configuration for a contemporary computer and its peripheral devices.

Turning now to the drawings, FIG. 1 shows a configuration of a contemporary computer and its peripheral devices. A monitor 20, one of the peripheral devices of a computer 10, can display characters or picture which can be recognized by a user. This is done according to the signal transmitted from the computer 10. A key board 30 has a number of keys each having its own inherent signal content.

Thus, if each key is input, the computer 10 performs an operation corresponding to the input key signal. A mouse 40 is one of the input devices for inputting signals to the computer 10. Likewise, the key board 30 can be used for inputting. In a contemporary practice, a number of tune keys are installed in one side of the monitor to tune the image or color of the picture displayed on the monitor. However, the number of the tune keys which can be installed in the monitor is limited.

Figure 2:
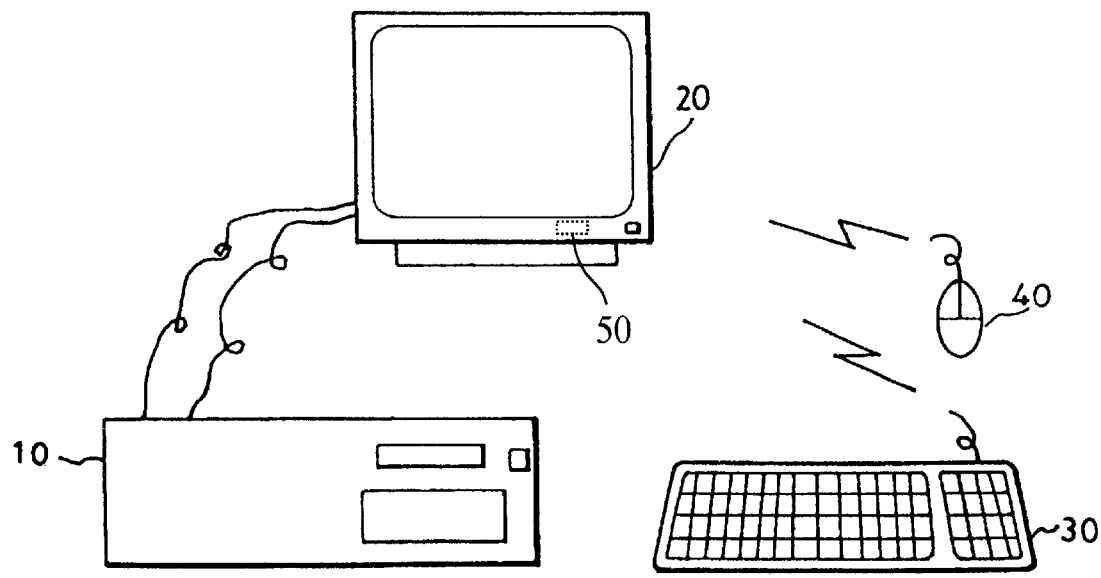
FIG. 2 is a diagram illustrating a configuration of a monitor control device constructed as a first preferred embodiment of the present invention.
Figure 3:
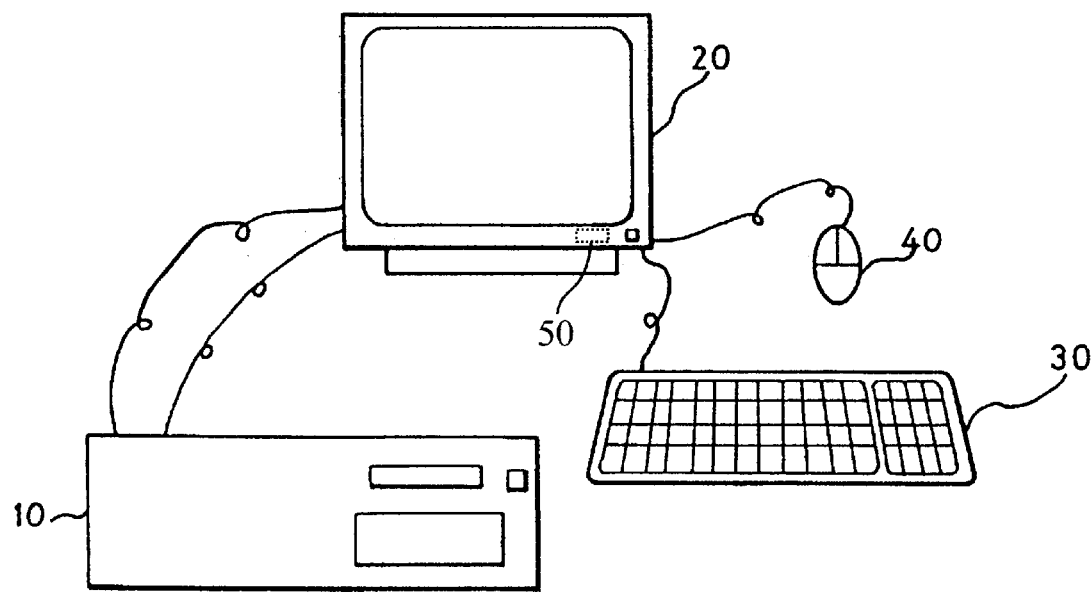
FIG. 3 is a diagram illustrating a configuration of a monitor control device constructed as a second preferred embodiment of the present invention.
Figure 4:
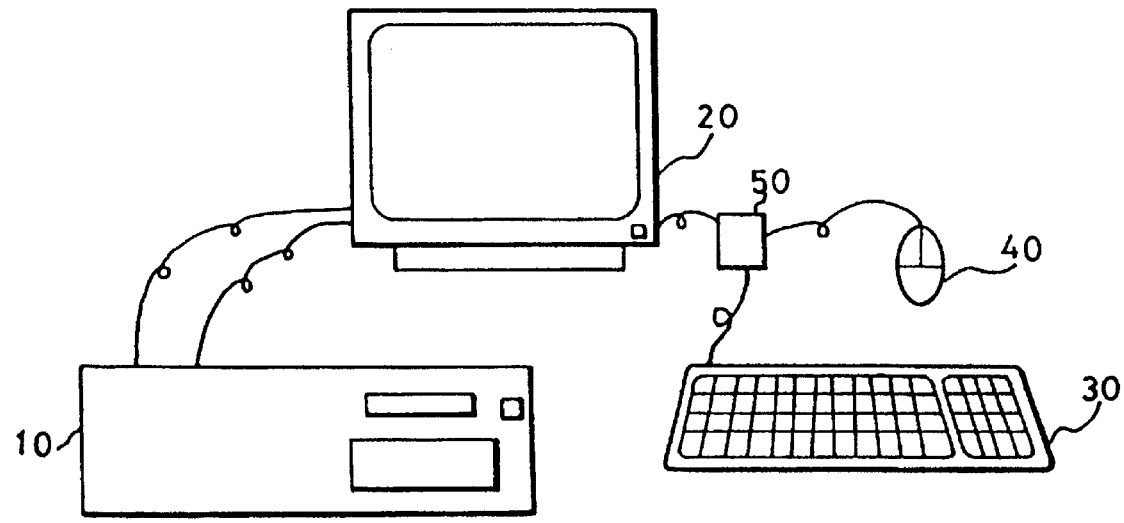
FIG. 4 is a diagram illustrating a configuration of a monitor control device constructed as a third preferred embodiment of the present invention.

Referring now to FIGS. 2 to 4, various monitor control devices according to the principles of the present invention constructed with a key board 30 and a mouse 40 that are separated from a computer 10 and can be remote-controlled. A remote-control signal receiving unit (not shown) is installed in one side of the front of the monitor, to receive the remote-control signals generated from the key board 30 and mouse 40. Referring to FIG. 3, the key board 30 and mouse 40 are not connected to the computer 10 but to the monitor 20, and two signal transmission lines are connected between the monitor 20 and the computer 10. Referring to FIG. 4, the key board 30 and mouse 40 separated from the computer 10 are connected to the monitor 20 via a controller 50.

As described above, the key board 30 and mouse 40 of the computer peripheral device are connected to the monitor 20 in various form and transmit signals. The signals are transmitted to the monitor 20 to control the monitor 20 or to the computer 10. In this case, the important feature is that the peripheral device (key board and mouse) is not connected to the computer but to the monitor. In addition, the signal generated from the computer peripheral device is determined whether it is a monitor control signal or a computer transmission signal. The controller 50 for generating a corresponding control signal according to the determination is installed inside or outside of the monitor 20.

The operation of the monitor control device according to the present invention will be discussed hereinbelow.

Referring to FIG. 2, the key board 30 which can be remote-controlled generates a signal by combination of several keys. The mouse 40 generates a signal by combination of the mouse buttons at the right and left or center thereof. This generated signal is outputted via a remote-control signal transmitting unit (not shown), such as located in mouse 40. The signal output via the remote-control signal transmitting unit is transmitted to a remote-control signal receiving unit (not shown) installed in one side of the monitor 20. Thereafter, this signal is transmitted to a signal receiving unit of the controller 50 in monitor 20, for example. A signal interpreting unit determines whether the transmitted signal is a monitor control signal or an information signal to be transmitted to the computer. According thereto, a corresponding signal is generated. The control signal is transmitted to the monitor 20 and computer 10 by the signal transmitting unit of the controller 50.

In FIG. 3, the key board 30 and mouse 40 are separated from the computer 10 but connected to the monitor 20 via the transmission line, as compared with FIG. 2. Thus, the generated signal is processed by the controller 50 installed in the monitor 20.

In FIG. 4, the controller 50 is placed at the exterior of the monitor 20, thus forming a signal transmission system of the key board 30 and mouse 40 and the monitor 20.

Even though the configuration of these monitor control devices are somewhat different one to another, the operating principles thereof are similar to each other. The operation of these constructions will be discussed with reference to accompanying flow sheets shown in FIGS. 5 through 8, inclusive.

Figure 5:
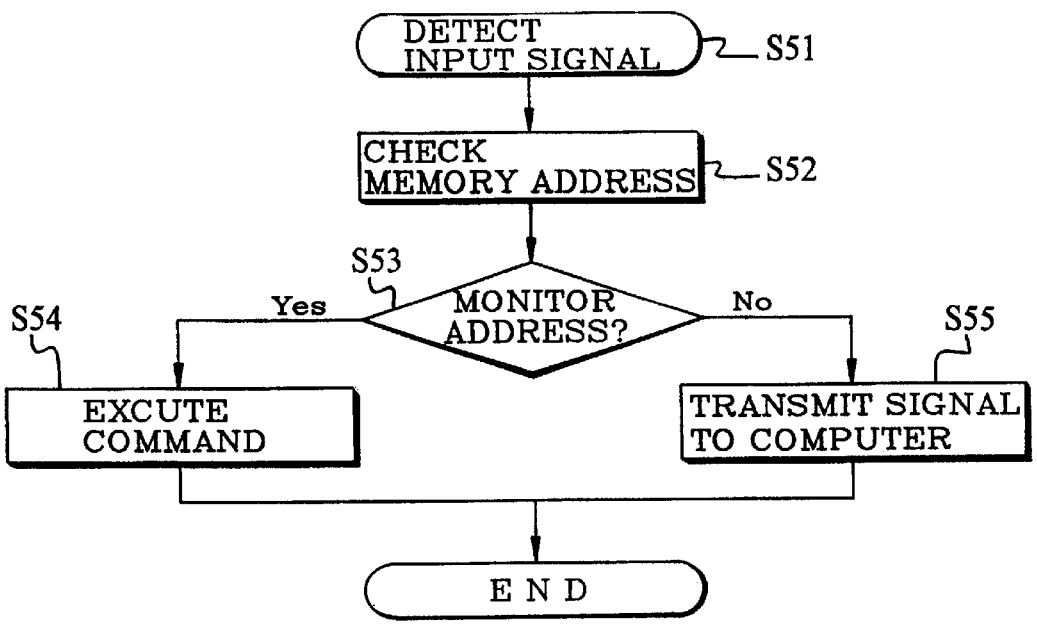
FIG. 5 is a flow chart showing a method for the practice with the monitor control device illustrated in FIG. 4.

FIG. 5 shows the operating steps of the controller 50 of FIG. 4. If a signal is input at S51, the controller 50 checks an address first at S52. If the address is its own address at S53, i.e. a monitor control signal, the controller 50 performs the command at S54. If the address is not its own address, it is transmitted to the computer at S55.

Figure 6:
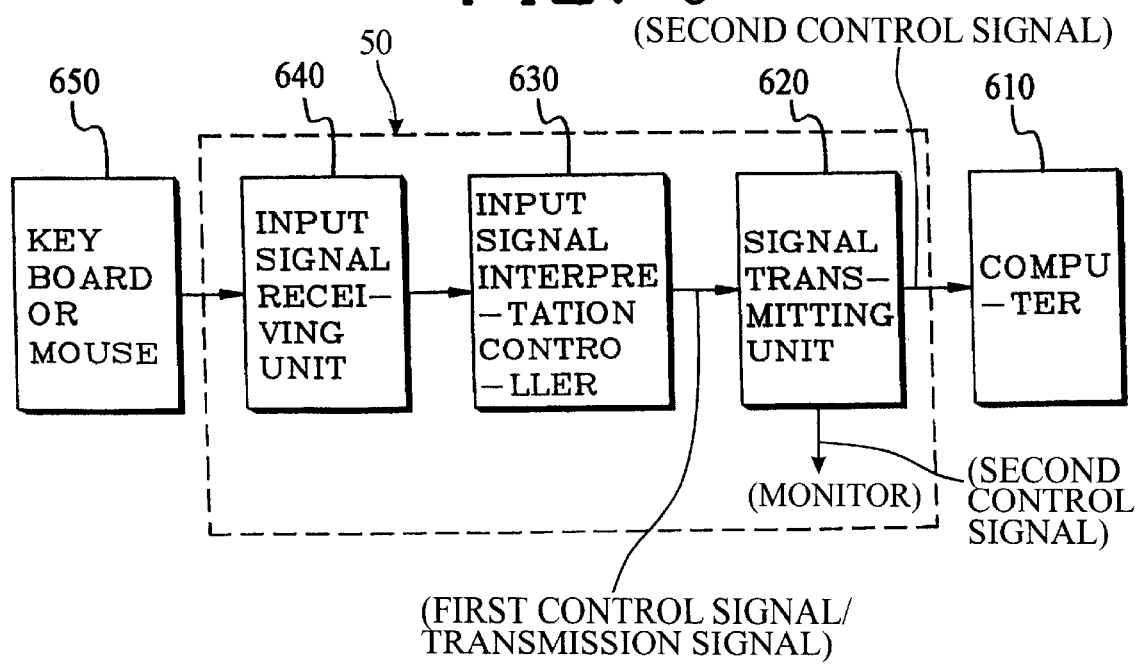
FIG. 6 is a block diagram showing a controller constructed according to the principles of the present invention.

FIG. 6 shows an internal configuration of the monitor including controller 50 to which the present invention is applied. The input signal receiving unit 640 receives a signal from the key board, mouse or the remote-controlled key board or mouse; hence the input unit 650 of FIG. 6 can be a keyboard 30 or a mouse 40. The controller 630 interprets the signal transmitted via the input signal receiving unit, such as a monitor control signal to be transmitted to a monitor or an information signal to be transmitted to the computer, and then performs the command. The signal transmitting unit 620 respectively transmits the input signal or the command result of the controller to the computer 610 or to the monitor 20.

Figure 7:
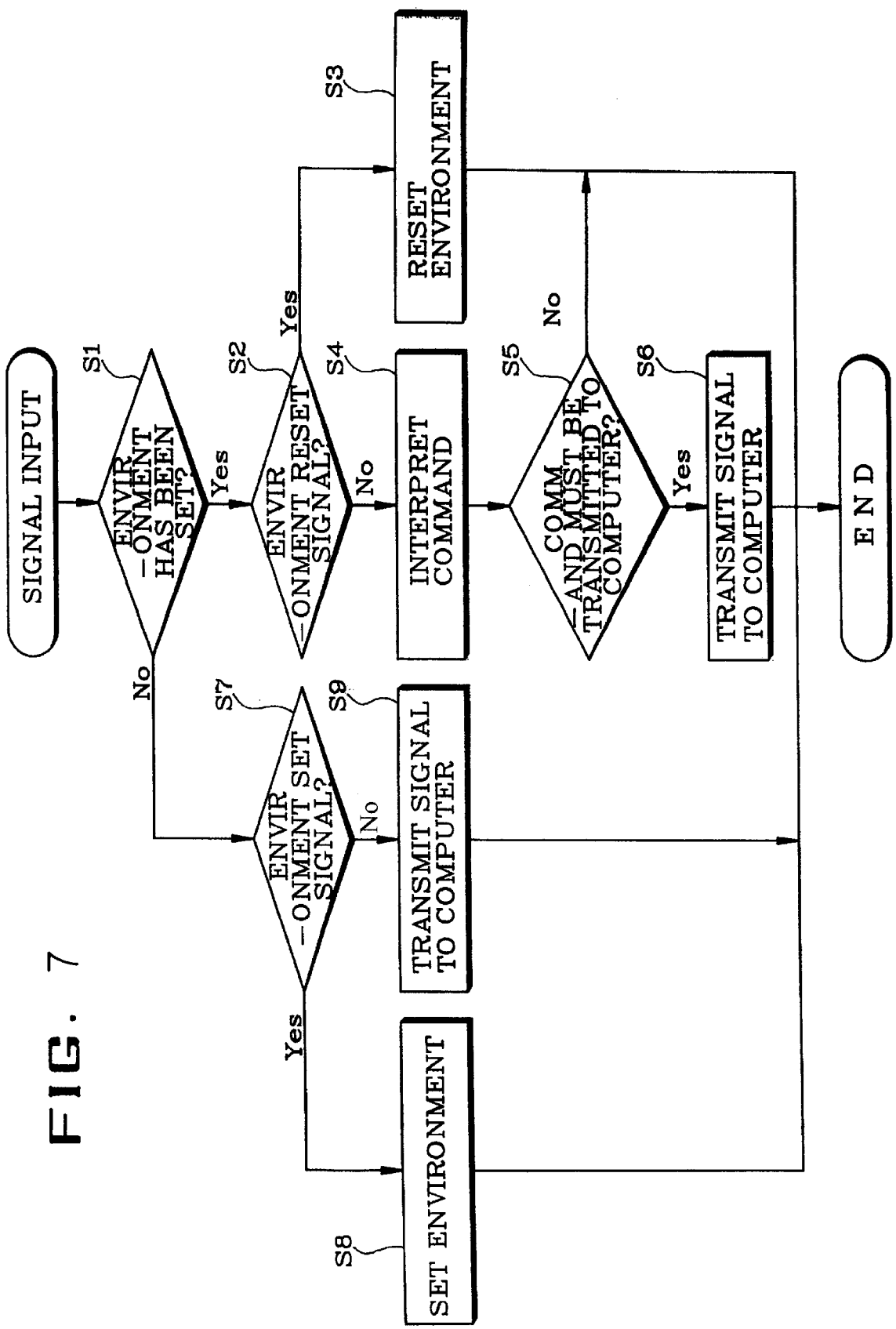
FIG. 7 is a flow chart showing a process for controlling a visual monitor according to the principles of the present invention.

The operation of the present invention will be discussed with reference to the flow sheet of FIG. 7. If a signal is input, the controller of the monitor checks in step S1 if an environment of the monitor has been set. If the environment has not been set, the controller checks in step S7 if the input signal is an environment set signal. If the input signal is an environment set signal, the controller sets the environment of the monitor in step S8, and if not, transmits the signal to the computer in step S9. If it is checked in step S1 that the environment has been set, the controller checks in step S2 if the input signal is an environment reset signal. If the input signal is an environment reset signal, the controller resets the environment in step S3 and if not, interprets the command in step S4. After the interpretation, the controller determines if the command needs to be transmitted to the computer in step S5 and then transmits it to the computer in step S6 or completes the procedure.

Meanwhile, the monitor can transmit various data of the computer peripheral device to the computer by using a specific input signal, and the operating procedure thereof will be discussed hereinbelow with reference to the flow chart of FIG. 8. The procedure is performed on the assumption that a specific software must be previously driven in step S20 before transmitting an EDID (Extended Display Identification Data). With this software, the computer can perceive that the data to be input thereafter is the EDID. After execution of the software, the user transmits a monitor environment setting signal to the monitor by using the key board or the mouse in step S30. Thereafter, the user transmits the command for transmitting the EDID in step S40. After receiving this command, the monitor transmits the EDID to the computer in step S50. After receiving all EDID, the computer displays a signal receiving completion message on the monitor in step S60. The user transmits an environment reset signal to the monitor by using the key board or the mouse in step S70.

In summary, the present invention includes the steps of receiving the signal generated by the computer peripheral device at the signal receiving unit in the monitor; interpreting the received signal to determine whether it is a signal for controlling the monitor or a signal to be transmitted to the computer; and if the received signal is a signal for controlling the monitor, outputting the monitor control signal and if the received signal is a signal for controlling the computer, outputting the computer control signal to the computer via the transmission line.

In addition, the method of transmitting the monitor setting state to the monitor and resetting the monitor state has the steps of transmitting a monitor setting start signal via the computer peripheral device connected to the monitor; transmitting data on the setting state of the monitor to the computer via the transmission line connected to the computer; displaying a signal receiving completion message by the computer after receiving the data on the monitor; and transmitting a monitor environment reset command to the monitor by using the computer peripheral device to reset the environment of the monitor.

As described above, without using several tune switches installed in outer surface of the monitor, the present invention can achieve the same effect as the case of using them. That is, the monitor can be controlled by connecting the computer peripheral device thereto, without the use of the tune switches. Thereby, the manufacturing costs and additional steps required in manufacturing can be remarkably reduced. Further, it is possible to control the power by adjusting the power switch of the monitor and computer, using the transmission line connected between the monitor and the computer.

It will be apparent to those skilled in the art that various modifications and variations can be made in the monitor control device of the present invention without departing from the spirit or scope of the invention. Thus, it is intended that the present invention cover the modifications and variations of this invention provided they come within the scope of the appended claims and their equivalents.

What is claimed is:

1. A device for controlling a monitor, comprising;
   a computer;
   a monitor connected to said computer for displaying variable visual images corresponding to a computer signal transmitted from said computer as characters and pictures recognizable to a user;
   an input unit for generating an image tune signal indicating preferences on image, a picture color tune signal indicating preferences on picture color, and a computer control signal; and
   a controller separate from said computer for communicating with said monitor, said controller for interpreting signals generated and received from said input unit, for selectively transmitting a monitor control signal for controlling said monitor to set preferences for display of said variable visual images on said monitor and for selectively transmitting said computer control signal to said computer.

2. The device of claim 1, wherein said input unit comprises a mouse.

3. The device of claim 1, wherein said input unit comprises a keyboard.

4. The device of claim 1, wherein said controller comprises:
   a signal receiving unit for receiving a received signal transmitted from said input unit;
   a signal interpreting unit for interpreting the received signal to determine whether the received signal is a signal for controlling said monitor or a signal to be transmitted to said computer and then for transmitting a first control signal and a transmission signal; and
   a signal transmitting unit for transmitting a second control signal according to an instruction from said signal interpreting unit, the instruction determining whether the second control signal is to be sent by said controller to said monitor or said computer.

5. The device of claim 4, wherein said input unit comprises a mouse.

6. The device of claim 4, wherein said input unit comprises a keyboard.

7. The device of claim 1, wherein said controller is installed in said monitor and said controller comprises:
   a signal receiving unit for receiving a received signal transmitted from said input unit;
   a signal interpreting unit for interpreting the received signal to determine whether the received signal is a signal for controlling said monitor or a signal to be transmitted to said computer and then for transmitting a first control signal and a transmission signal; and
   a signal transmitting unit for transmitting a second control signal according to an instruction from said signal interpreting unit, the instruction determining whether the second control signal is to be sent by said controller to said monitor or said computer.

8. The device of claim 7, wherein said input unit comprises a mouse.

9. The device of claim 7, wherein said input unit comprises a keyboard.

10. The device of claim 7, wherein said input unit comprises a remote-control signal transmitting unit, and said monitor comprises a remote-control signal transceiving unit in a predetermined portion to receive and transmit a signal generated from said remote-control signal transmitting unit to said controller.

11. The device of claim 10, wherein said input unit comprises a mouse.

12. The device of claim 10, wherein said input unit comprises a keyboard.

13. The device of claim 1, wherein said input unit comprises a remote-control signal transmitting unit, and said monitor comprises a remote-control signal transceiving unit in a predetermined portion to receive and transmit a signal generated from said remote-control signal transmitting unit to said controller.

14. The device of claim 13, wherein said input unit comprises a mouse.

15. The device of claim 13, wherein said input unit comprises a keyboard.

16. A method for controlling a monitor, comprising the steps of:
   receiving a first signal generated from an input unit at a signal receiving unit communicating with a controller, said controller communicating with a monitor;
   interpreting said first signal at said controller to determine whether said first signal is one of a signal for controlling said monitor and a signal to be transmitted to a computer, said controller being separate from said computer;
   when said first signal is a signal for controlling said monitor, transmitting by said controller a monitor control signal to control said monitor, and when said first signal is a signal for controlling said computer, transmitting by said controller a computer control signal to said computer.

17. A method for setting an environment of a monitor, comprising the steps of:

transmitting data to set an environment of a monitor from a computer peripheral device to a controller communicating with a monitor executing a software program to permit a computer to adjust to said data transmitted from said computer peripheral device, said controller being separate from said computer;

setting through said controller an environment of said monitor based upon said data transmitted from said computer peripheral device and transmitting said data transmitted from said computer peripheral device through said controller to said computer;

after said computer receives the said data transmitted from said computer peripheral device, informing a user of a completion of data reception via said monitor; and transmitting a reset signal to reset through said controller the environment of said monitor based upon said data transmitted from said computer peripheral device.

* * * * *